United States Patent Office 3,053,645
Patented Sept. 11, 1962

3,053,645
FUEL COMPOSITION
Eldon B. Cole, Tulsa, and Phillip M. Niles, Sand Springs, Okla., assignors, by mesne assignments, to Sinclair Research, Inc., New York, N.Y., a corporation of Delaware
No Drawing. Filed Dec. 22, 1958, Ser. No. 781,891
10 Claims. (Cl. 44—73)

The present invention relates to fuel oil compositions stabilized against the harmful effects of deterioration. More particularly the invention is concerned with distillate fuel oils containing certain additives adapted to stabilize the fuel oil against deterioration during storage or use.

Hydrocarbon fuels, for example, those distilling primarily in the range from about 300 to 750° F. tend to deteriorate and form sediment, insoluble gum, etc. which if not removed, plug filter screens, orifices and other parts of equipment used in burning the oils. The formation of sediment, insoluble gum, etc. in these oils is attributable primarily to the oxidation of unstable constituents contained in the oils. This oxidation takes place under prolonged storage at atmospheric temperatures as well as under elevated temperatures during use.

It has now been found that the oil-compatible, i.e. soluble, miscible or dispersible, condensation products of a lower aliphatic aldehyde and certain fatty diamines when added in relatively small amounts to distillate fuel oils effectively stabilize the oils against deterioration. The condensation products of the present invention are prepared by reacting about one mole equivalent of an aliphatic aldehyde with about 0.5 to 2 moles equivalents of the fatty diamine. Preferably, the molecular ratio of the fatty diamine to aldehyde employed is about 1:1. The reaction is carried out at temperatures high enough to remove water but not so high as to degrade the product and is continued at least until the product is substantially completely dehydrated, generally about 175° F. to 400° F., preferably about 190 to 325° F., depending upon the solvent used, e.g. toluene or xylene.

The fatty diamines contemplated by the present invention have the structural formula:

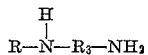

in which R is an aliphatic hydrocarbon radical of at least about 6 and preferably about 12 to 22 carbon atoms and R₃ is a divalent aliphatic hydrocarbon radical containing about 2 to 8 carbon atoms. The hydrocarbon radicals can be straight or branched chain and substituted or unsubstituted. Preferably, $R_3$ is a polymethylene group of about 2 to 8 carbon atoms and advantageously about 2 to 4 carbon atoms. These diamines can be prepared by a variety of well-known procedures, as for example, by reacting an aliphatic chloride containing the desired number of carbon atoms with a polymethylene diamine which contains from about 2 to 8 methylene groups. The aliphatic R group which is attached to the nitrogen atom is either saturated or unsaturated and is preferably an alkyl or alkylene residue radical obtained from fatty acids. Fatty acids which are suitable for providing residues containing the desired number of carbon atoms can be obtained from fats and oils such as soybean oil, lard oil, castor oil, corn oil, tallow, coconut oil, etc. or from resin acids such as those derived from tall oil which contains a mixture of fatty acids and resin acids.

An example of a preferred fatty amine used in the preparation of the condensation products of this invention is a diamine designated as "Duomeen T" in which $R_3$ in the above formula is trimethylene and R is the straight chain hydrocarbon residue derived from tallow fatty acids containing 16 to 18 carbon atoms, both saturated and unsaturated. Similar fatty diamines can be used in which the hydrocarbon group is derived from monobasic acids such as, for example, lauric acid, myristic acid, palmitic acid, stearic acid, margaric acid, oleic acid, ricinoleic acid, linoleic acid, etc., as well as monobasic acids derived by oxidation of petroleum waxes.

The aldehydes useful in preparing the condensation products of the present invention are the lower aliphatic aldehydes representative of which are formaldehyde and butyraldehyde. Included within the formaldehydes are the polymers of formaldehydes such as paraformaldehyde, which yield formaldehyde during the reaction.

The fuel oils which are improved in accordance with this invention are hydrocarbon fractions boiling primarily in the range from about 300° F. to 750° F. Such fuel oils are generally known as distillate fuel oils. It must be understood, however, that this term is not restricted to straight-run distillates. These fuels can be straight-run distillate fuel oils, catalytically or thermally cracked distillate fuel oils or mixtures of straight-run distillate fuel oils, naphthas and the like, with cracked distillate stocks. The cracked materials will frequently be about 15 to 70 volume percent of the fuel. Moreover, such fuel oils can be treated in accordance with well known commercial methods, such as, acid or caustic treatment, solvent refining, clay treatment, etc.

In order to effectively stabilize the distillate fuel oils the condensation products of the present invention are added to the fuel oils in concentrations varying between about 5 pounds per thousand barrels of oil and about 250 pounds per thousand barrels of oil. Preferably the concentration varies between about 5 and 50 pounds per thousand barrels of oil.

Metal deactivators in relatively small amounts, e.g. up to about 2 pounds/1000 barrels of fuel oil, preferably about 0.5 to 1 pound per 1000 barrels of fuel oil, can be added along with additives of the present invention to enhance the latter's stabilizing effect on the fuel oils. Examples of suitable metal deactivators are N,N'-disalicylidene-1,2-propylene diamine; dimethyldithio oxamide and condensation products of o-hydroxy aromatic aldehyde or o-hydroxy aromatic ketone and an aliphatic polyamine as disclosed by Downing et al. in Patent Nos. 2,-181,121; 2,255,597 and 2,301,861. If desired, the fuel oil compositions of the present invention can contain other additives for the purpose of achieving other results. Thus, for example, there can be present foam inhibitors, anti-rust agents, and ignition and burning quality improvers.

The tests used to determine the stability of the fuel oil compositions of the present invention were the 100° F. Cabinet Storage Test and the high temperature stability test. In the 100° F. Cabinet Storage Test 400 milliliter samples of the fuel oil composition are placed in a cabinet maintained at 100° F., for periods of 2, 4 and 6 months. At the end of the test periods the sample is removed from the cabinet and cooled. The cooled sample is filtered to remove the insoluble matter. The weight of such matter in milligrams is reported as the amount of deposit or sediment per 100 milliliters.

In the high temperature stability test, samples of the fuel oil compositions are passed through a filter disc immediately after preparation ("0 Weeks Storage"), and again after storage in cans at room temperature ("12 Weeks Storage"). In addition, the fuel compositions are similarly tested without heating to show deterioration at room temperature ("Before Heating") and in the regular high temperature test at 300° F. for 90 minutes ("After Heating"). The color of the filtered oil is recorded and the condition of each filter disc after the test was given a numerical scale rating, 0 representing no staining and 5 representing heavy staining and deposits.

The following examples will serve to illustrate the compositions of the present invention but are not to be considered limiting.

EXAMPLE I 500 grams of Duomeen T, 41 grams of commercial paraformaldehyde, 300 grams of xylene and 50 grams of water were charged to a flask equipped with agitator, condenser, water trap and heating mantle. The mixture was heated with constant agitation to about 200° F. When the xylene-water mixture started to reflux, a temperature sufficient to keep the reflux going was maintained and after 5½ hours a total of 82 grams of water was removed from the water trap. As no further water was released the reaction was assumed to be complete and a product containing 63 percent active ingredient (condensation product) in xylene dilution was obtained and designated #1089.

The above product was added to a distillate fuel oil composed of 50 volume percent water white distillate having an end point of 565 and 50 volume percent light cycle oil derived by catalytic cracking of gas oil in concentrations of 17 and 34 pounds per 1000 barrels of fuel oil. The physical properties of the fuel oil blend are shown in Table I.

Table I
TESTS ON NEAT FUEL

Physical tests:
Gravity, ° API _____ 34.4
Flash, ° F _____ 170
Cloud point, ° F _____ −18
Pour point, ° F _____ −30
Distillation (200 ml.):
  IBP ° F _____ 354
  5% _____ 419
  10 _____ 442
  20 _____ 456
  30 _____ 464
  40 _____ 472
  50 _____ 480
  60 _____ 488
  70 _____ 498
  80 _____ 508
  90 _____ 524
  95 _____ 536
  EP _____ 563
Recovery, percent _____ 99.5
Residue _____ 0.5

The fuel compositions thus prepared were subjected to the 100° F. Cabinet Storage Test for periods of two and four months, respectively, to determine the effect of the additive for stabilizing heating oils. The fuel compositions were also subjected to the high temperature stability test to determine the effectiveness of the additives as stabilizers for diesel fuels. The neat fuel was similarly tested for purposes of comparison. The test results are shown in Table II.

Table II
100° F. Cabinet Storage Test

| Additive | Conc. #/MB | MDA² #/MB | Two Months | | | Four Months | | |
|---|---|---|---|---|---|---|---|---|
| | | | Deposits mg./100 ml. | NPA Color | Visual Inspection for Precipitate in Storage Tube | Deposits mgs./100 ml. | NPA Color | Visual Inspection for Precipitate in Storage Tube |
| Neat Fuel | | | 2.2 | 3− | Heavy | 3.4 | 3 | Heavy. |
| SS 1089 ¹ | 17 | | 0.6 | 3½− | None | 0.6 | 3½− | None. |
| SS 1089 ¹ | 34 | | 0.6 | 3½− | ___do___ | 0.5 | 3½− | Do. |
| SS 1089 | 17 | 1 | 0.3 | 3 | ___do___ | 0.5 | 3½− | Do. |

High Temperature Stability Test

| Additive | Conc. #/MB | MDA² #/MB | 0 Weeks Storage | | | | | | 12 Weeks Storage | | | | | |
|---|---|---|---|---|---|---|---|---|---|---|---|---|---|---|
| | | | Before Heating | | | After Heating | | | Before Heating | | | After Heating | | |
| | | | Filter Disk ³ | Color | | Filter Disk ³ | Color | | Filter Disk ³ | Color | | Filter Disk ³ | Color | |
| | | | | NPA | OD | | NPA | OD | | NPA | OD | | NPA | OD |
| Neat Fuel | | | 2 | 2+ | 11 | 4 | 4+ | 86 | 3 | 2− | 19 | 4 | 4½+ | 100 |
| SS 1089 ¹ | 17 | | 0 | 2− | 9 | 3 | 3½ | 53 | 1 | 3− | 18 | 5 | 4½ | 65 |
| SS 1089 ¹ | 34 | | 0 | 2 | 9 | 2 | 3½ | 40 | 0 | 3− | 19 | 3 | 4+ | 61 |
| SS 1089 | 17 | 1 | 0 | 2 | 9 | 1 | 2½− | 14 | 0 | 3− | 22 | 2 | 3½− | 32 |

¹ 63% Condensation product of Duomeen T and commercial paraformaldehyde in xylene of Example I.
² N,N′-disalicylidene-1,2-propylene diamine.
³ *Filter Disk Code:* 0-no discoloration; 1-light discoloration but no definite evidence of precipitate; 2-medium brown discoloration but not black, indication of trace of precipitate; 3-black deposit showing definite evidence of insolubles in fuel; 4-black deposit showing considerable precipitate; 5-black deposit showing heavy precipitate.

EXAMPLE II 1890 grams of Duomeen T and 360 grams of butyraldehyde (n) were heated with constant stirring in an open kettle at a temperature of 240 to 260° F. until water removal was essentially complete. The condensation product obtained was added to the neat fuel of Example I in concentrations of 225 pounds/1000 barrels of fuel oil and 113 pounds/1000 barrels of fuel oil. The fuel compositions thus prepared were each subjected to the 100° F. Cabinet Storage Test for periods of 2, 4 and 6 months. The neat fuel was similarly tested for purposes of comparison. The test results are shown in Table III.

37% formaldehyde solution as shown in Table IV. All of the materials were made in accordance with the

Table III

100° F. Cabinet Storage Test

| Additive | Conc. #/MB | Two Months | | Four Months | | Six Months | |
|---|---|---|---|---|---|---|---|
| | | Deposits mg./100 ml. | NPA Color | Deposits mg./100 ml. | NPA Color | Deposits mg./100 ml. | NPA Color |
| Neat Fuel | | 2.7 | 3 | 7.3 | 3½+ | 10.4 | 4½− |
| SS 897 | 225 | 0.6 | 4+ | 2.7 | 5− | 6.5 | 5− |
| SS 897 | 113 | 0.8 | 4− | 2.5 | 4½− | 7.6 | 5− |

High Temperature Stability Test

| Additive | Conc. #/MB | 0 Weeks Storage | | | | 12 Weeks Storage | | | |
|---|---|---|---|---|---|---|---|---|---|
| | | Before Heating | | After Heating | | Before Heating | | After Heating | |
| | | Filter Disk[1] | NPA Color | Filter Disk[1] | NPA Color | Filter Disk[1] | NPA Color | Filter Disk[1] | NPA Color |
| Neat Fuel | | 0 | 1+ | 4 | 5+ | 3 | 2½+ | 4 | 7− |
| SS 897 | 225 | 0 | 1½− | 2 | 3½+ | 0 | 3½+ | 4 | 5− |
| SS 897 | 113 | 0 | 2½− | 4 | 4+ | 2 | 4− | 4 | 6− |

[1] Filter Disk Code: See Table II.

The results of the 100° F. Cabinet Storage Test in Tables II and III show that the condensation product additives of this invention effectively inhibited the formation of deposits in the fuel oil. For example, comparing in Table II and III the tests on the additive fuel composition with the test on the neat fuel, it is seen that the amount of deposit formed in the neat fuel was at the lowest 2.2 milligrams/100 milliliters whereas the amount of deposit formed in the novel fuel composition was at the highest 0.6 milligrams/100 milliliters. Also shown in Table II is the appreciable enhancement of the additive of Example I as a fuel oil stabilizer by the incorporation of a metal deactivator. Likewise, comparison of the tests in Table III of the neat fuel and the fuel compositions clearly demonstrates the effectiveness of the additive of Example II as a stabilizer. Thus, the test results particularly illustrate the effectiveness of the additives as home heating oil stabilizers.

Examination of the results of the high temperature tests in Tables II and III show that the additives of the present invention improve, in general, the stability of diesel fuels. It is preferred, however, when using the distillate fuels as diesel oils, to incorporate in addition to the additive of the present invention minor amounts of a metal deactivator. As shown in Table II, the combination of a minor amount of metal deactivator with the additive of the present invention produces an excellent stabilizer for diesel fuels.

EXAMPLE III

A series of condensation products were prepared using various amounts of Duomeen T, paraformaldehyde and 37% formaldehyde solution as shown in Table IV. All of the materials were made in accordance with the method of Example I. Reflux conditions were employed in each case using xylene diluent for the azeotropic removal of water.

Table IV

| No. | Fatty Diamine | | Aldehyde | | Water, Grams | Xylene, Grams | Catalyst | |
|---|---|---|---|---|---|---|---|---|
| | Kind | Grams | Kind | Grams | | | Kind | Gram |
| SS 794 | Duomeen T. | 200 | Paraformaldehyde. | 50 | None | 250 | Sulfonic Acid. | 0.8 |
| SS 990 | do | 280 | do | 70 | do | 350 | None | |
| SS 996 | do | 250 | 37% Formaldehyde Sol. | 56 | do | 185 | do | |
| SS 1000 | do | 200 | do | 135 | do | 250 | do | |
| SS 1002 | do | 200 | do | 135 | do | 250 | H₂SO₄ | 2.0 |
| SS 1028 | do | 200 | do | 165 | do | 200 | None | |
| SS 1042 | do | 400 | do | 81 | do | 300 | do | |

Small amounts of the products prepared are added to the distillate fuel oil of Example I and tested as in Example I. These products show value as distillate fuel oil stabilizers.

We claim:
1. A fuel oil composition consisting essentially of a distillate fuel oil and a small amount sufficient to effectively stabilize said oil against deterioration of an oil-compatible condensation product of a fatty diamine having the structural formula:

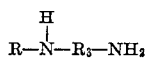

in which R is an aliphatic hydrocarbon chain of about 6 to 22 carbon atoms and $R_3$ is a divalent aliphatic hydrocarbon radical containing about 2 to 8 carbon atoms and a lower aliphatic aldehyde containing 1 to 4 carbon atoms.

2. The fuel oil composition of claim 1 in which the distillate fuel contains cracked components.

3. The fuel oil composition of claim 1 in which the lower aliphatic aldehyde is formaldehyde.

4. The fuel oil composition of claim 1 wherein $R_3$ in the structural formula of the fatty diamine is trimethylene and R is the straight chain hydrocarbon residue derived from tallow fatty acids containing 16 to 18 carbon atoms and the aliphatic aldehyde is formaldehyde.

5. The fuel oil composition of claim 1 wherein the condensation product is present in amounts ranging from about 5 pounds per thousand barrels of fuel oil to 250 pounds per thousand barrels of fuel oil.

6. The fuel oil composition of claim 1 in which the distillate fuel oil is a diesel fuel.

7. The fuel oil composition of claim 4 wherein the condensation product is present in amounts ranging from about 5 pounds per thousand barrels of fuel oil to 50 pounds per thousand barrels of fuel oil.

8. A fuel oil composition consisting essentially of a distillate diesel fuel and about 5 to 250 pounds per 1000 barrels of said fuel of an oil-compatible condensation product of a fatty diamine having the structural formula:

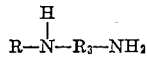

in which R is an aliphatic hydrocarbon chain of about 6 to 22 carbon atoms and $R_3$ is a divalent aliphatic hydrocarbon radical containing about 2 to 8 carbon atoms and a lower aliphatic aldehyde containing 1 to 4 carbon atoms and about .25 to 2 pounds per 1000 barrels of said fuel of N,N'-disalicylidene-1,2-propylenediamine.

9. The fuel oil composition of claim 8 in which the lower aliphatic aldehyde is formaldehyde.

10. A fuel oil composition consisting essentially of a distillate diesel fuel and about 5 to 250 pounds per 1000 barrels of said fuel of an oil-compatible condensation product of a fatty diamine having the structural formula:

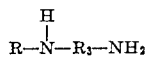

in which $R_3$ is trimethylene and R is a straight chain hydrocarbon residue derived from tallow fatty acids containing 16 to 18 carbon atoms and formaldehyde and about .5 to 1 pound per 1000 barrels of said fuel of N,N'-disalicylidene-1,2-propylenediamine.

References Cited in the file of this patent

UNITED STATES PATENTS

| | | |
|---|---|---|
| 1,594,983 | Sommerville | Aug. 3, 1926 |
| 2,223,411 | Fuller et al. | Dec. 3, 1940 |
| 2,282,513 | Downing et al. | May 12, 1942 |
| 2,284,267 | Downing et al. | May 26, 1942 |
| 2,701,187 | Andress | Feb. 1, 1955 |

FOREIGN PATENTS

| | | |
|---|---|---|
| 793,448 | Great Britain | Apr. 16, 1958 |